United States Patent
Kim et al.

(10) Patent No.: US 9,237,351 B2
(45) Date of Patent: Jan. 12, 2016

(54) ENCODING/DECODING APPARATUS AND METHOD FOR PARALLEL CORRECTION OF IN-LOOP PIXELS BASED ON MEASURED COMPLEXITY, USING VIDEO PARAMETER

(75) Inventors: Doo Hyun Kim, Seoul (KR); Dong Gyu Sim, Seoul (KR); Joon Ho Song, Hwaseong-si (KR); Do Hyung Kim, Hwaseong-si (KR); Eun Kyung Ryu, Seoul (KR); Shi Hwa Lee, Seoul (KR); Hyun Ho Cho, Seoul (KR); Jung Han Seo, Seoul (KR)

(73) Assignees: SAMSUNG ELECTRONICS CO., LTD., Suwon-Si (KR); KWANGWOON UNIVERSITY INDUSTRY-ACADEMIC COLLABORATIVE FOUNDATION, Seoul (KR)

( * ) Notice: Subject to any disclaimer, the term of this patent is extended or adjusted under 35 U.S.C. 154(b) by 603 days.

(21) Appl. No.: 13/606,544

(22) Filed: Sep. 7, 2012

(65) Prior Publication Data

US 2013/0215976 A1  Aug. 22, 2013

(30) Foreign Application Priority Data

Feb. 21, 2012  (KR) .................. 10-2012-0017343

(51) Int. Cl.
| | |
|---|---|
| H04N 19/00 | (2014.01) |
| H04N 19/14 | (2014.01) |
| H04N 19/176 | (2014.01) |
| H04N 19/127 | (2014.01) |
| H04N 19/46 | (2014.01) |
| H04N 19/436 | (2014.01) |
| H04N 19/86 | (2014.01) |

(52) U.S. Cl.
CPC ............. *H04N 19/14* (2014.11); *H04N 19/127* (2014.11); *H04N 19/176* (2014.11); *H04N 19/436* (2014.11); *H04N 19/46* (2014.11); *H04N 19/86* (2014.11)

(58) Field of Classification Search
CPC ........................................ H04N 19/14
USPC ..................................... 375/240.26
See application file for complete search history.

(56) References Cited

U.S. PATENT DOCUMENTS

| | | |
|---|---|---|
| 2005/0013494 A1 | 1/2005 | Srinivasan et al. |
| 2007/0147515 A1 | 6/2007 | Kawashima et al. |
| 2008/0056366 A1 | 3/2008 | Bhaskaran |
| 2009/0304085 A1* | 12/2009 | Avadhanam et al. .... 375/240.24 |
| 2011/0032990 A1* | 2/2011 | Choi et al. ............... 375/240.13 |
| 2011/0145549 A1 | 6/2011 | Suk et al. |
| 2012/0082244 A1* | 4/2012 | Chen et al. ............... 375/240.29 |

FOREIGN PATENT DOCUMENTS

| | | |
|---|---|---|
| JP | 2007-235886 | 9/2007 |
| KR | 10-2010-0136907 | 12/2010 |
| KR | 10-2011-0001990 | 1/2011 |
| KR | 10-2011-0001991 | 1/2011 |
| KR | 10-2011-0020391 | 3/2011 |
| KR | 10-2011-0059654 | 6/2011 |
| WO | WO 2010/134973 A1 | 11/2010 |

\* cited by examiner

*Primary Examiner* — Sath V Perungavoor
*Assistant Examiner* — Jeffery Williams
(74) *Attorney, Agent, or Firm* — Staas & Halsey LLP

(57) ABSTRACT

An encoding/decoding apparatus and method for parallel correction of in-loop pixels based on complexity using a video parameter may include a complexity measuring unit to measure a complexity of an in-loop pixel correction process, using video codec parameter information, in a video codec, and a core allocating unit to evenly distribute jobs associated with the in-loop pixel correction process, using the measured complexity.

20 Claims, 11 Drawing Sheets

First deblocking filtering unit → (1), (2), (3), (4), (5)
Second deblocking filtering unit → (6), (7)

First deblocking filtering unit → (1), (2), (3), (4)
Second deblocking filtering unit → (5), (6), (7)

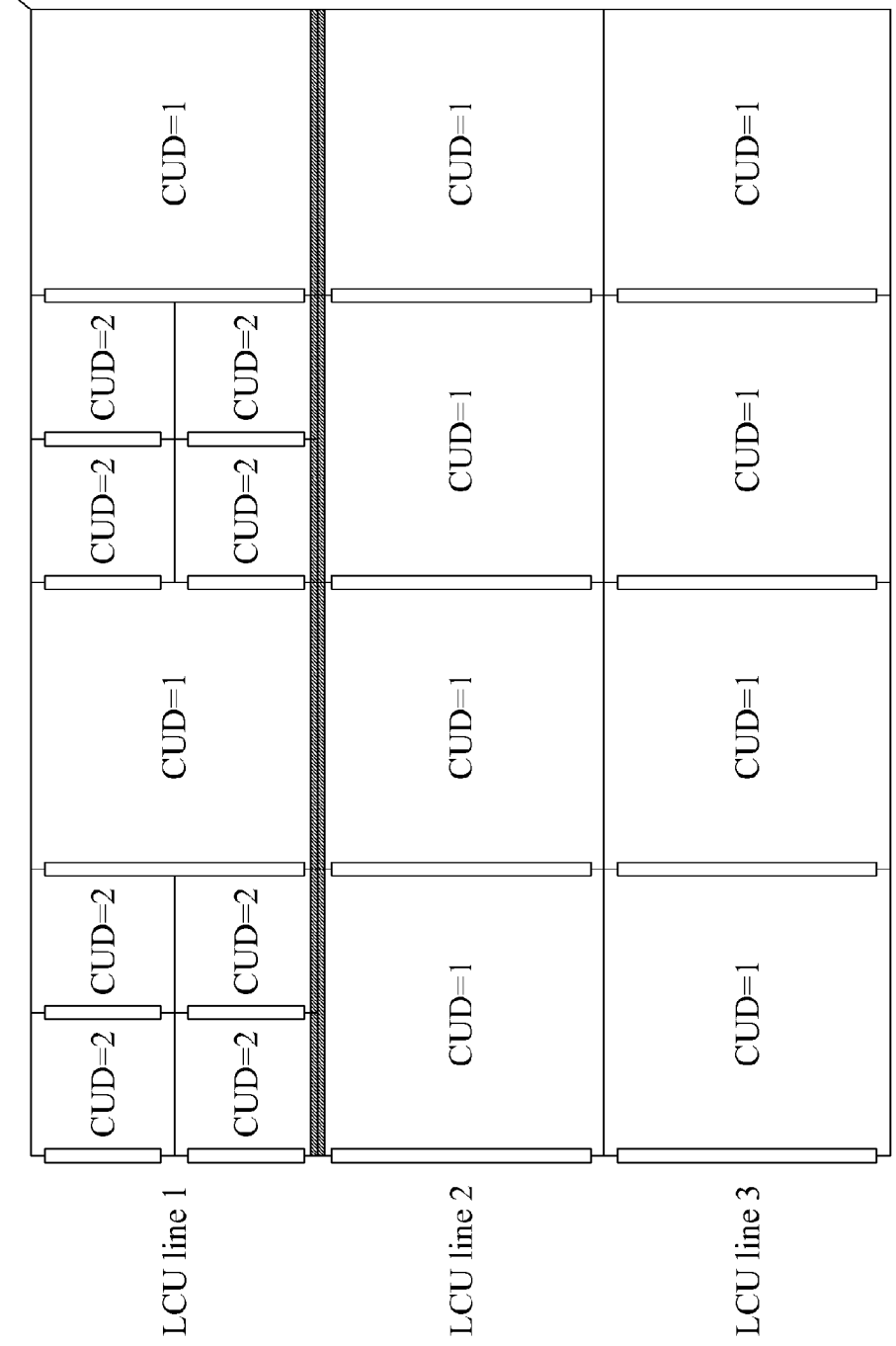

ENCODING/DECODING APPARATUS AND METHOD FOR PARALLEL CORRECTION OF IN-LOOP PIXELS BASED ON MEASURED COMPLEXITY, USING VIDEO PARAMETER

CROSS-REFERENCE TO RELATED APPLICATIONS

This application claims the priority benefit of Korean Patent Application No. 10-2012-0017343, filed on Feb. 21, 2012, in the Korean Intellectual Property Office, the disclosure of which is incorporated herein by reference.

BACKGROUND

1. Field

The following description relates to a technology that may measure complexity of an in-loop pixel correction process using video codec parameter information in a video codec, and may enable jobs associated with the in-loop pixel correction process to be evenly distributed to encoding/decoding apparatuses for parallel correction of in-loop pixels, using the measured complexity, to improve a parallel processing speed.

2. Description of the Related Art

Due to an increase in demand for images with a High Definition (HD) level or higher, there is a need for a new encoding and decoding method to achieve a higher efficiency than provided by the H.264/Advanced Video Coding (AVC) video codec. Accordingly, recently, the Moving Picture Experts Group (MPEG) and the Visual Coding Experts Group (VCEG) are standardizing a next-generation video codec named "High Efficiency Video Coding (HEVC)" through a Joint Collaborative Team on Video Coding (JCT-VC).

In other words, the HEVC refers to the next-generation video codec that is being standardized by the JCT-VC established in collaboration with the MPEG and VCEG.

A large number of technologies are being proposed to standardize the HEVC. Among the technologies, a technology with high compression efficiency relative to technical complexity is employed. In particular, a plurality of technologies associated with in-loop pixel correction are employed, compared to the H.264/AVC. Each of the technologies associated with in-loop pixel correction is described below.

The HEVC may employ an in-loop pixel correction technology that may apply filtering to a restored image, in an order of a de-blocking filter, a Sample Adaptive Offset (SAO), and an Adaptive Loop Filter (ALF).

The de-blocking filter may calculate a boundary strength in a boundary of a Coding Unit (CU), a Prediction Unit (PU), and a Transform Unit (TU) that are located in a block larger than an 8×8 block, and may perform filtering to remove a blocking artifact occurring in a block boundary.

The SAO may be performed around an edge in an image to which de-blocking filtering is applied, or performed on a set of predetermined pixel values.

The SAO refers to a technology of dividing a region, namely a basic unit, into a plurality of pixel sets, obtaining an average offset in pixels included in a corresponding set, adding the average offset to restored pixel values, and enabling a restored image to be similar to an original image.

The ALF refers to a technology of obtaining a filter to minimize a mean square error between an original image and an image to which the SAO is applied, performing filtering using the filter, and minimizing an error in a restored image.

The ALF may transmit an on/off flag regarding whether filtering is applied in a quad-tree block unit, and may perform more effective filtering.

SUMMARY

The foregoing and/or other aspects are achieved by providing an encoding/decoding apparatus for parallel correction of in-loop pixels, including a complexity measuring unit to measure a complexity of an in-loop pixel correction process in a video codec, using video codec parameter information, and a core allocating unit to evenly distribute jobs associated with the in-loop pixel correction process, using the measured complexity.

The foregoing and/or other aspects are achieved by providing an encoding/decoding method for parallel correction of in-loop pixels, including measuring a complexity of an in-loop pixel correction process, using video codec parameter information during encoding/decoding, and evenly distributing jobs associated with the in-loop pixel correction process, using the measured complexity.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which:

FIG. 11 illustrates a diagram of a scheme of parallel performing de-blocking filtering when a Largest Coding Unit (LCU) line is used as a basic unit, according to example embodiments.

DETAILED DESCRIPTION

Figure 1:
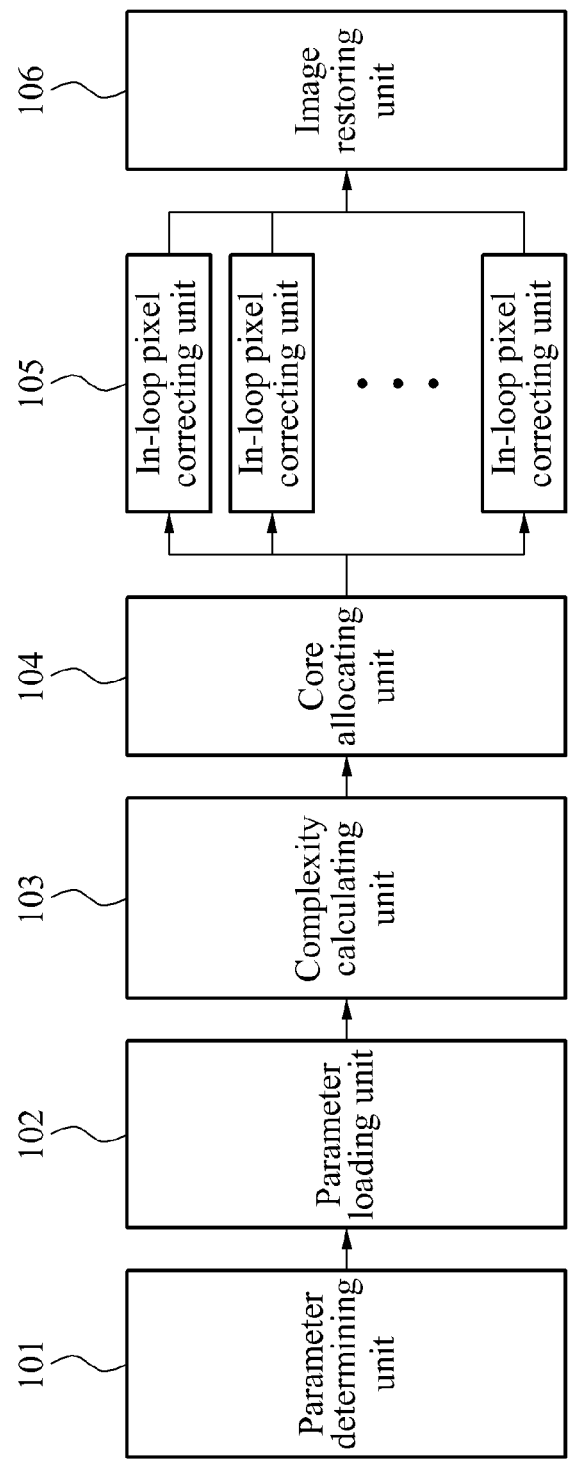
FIG. 1 illustrates a block diagram of a parallel decoding apparatus for parallel correction of in-loop pixels based on complexity according to example embodiments.

Reference will now be made in detail to example embodiments, examples of which are illustrated in the accompanying drawings, wherein like reference numerals refer to like elements throughout. Example embodiments are described below to explain the present disclosure by referring to the figures.

The example embodiments relate to a method and apparatus for efficiently parallel processing an in-loop pixel correction process in a video codec.

In the video codec, the in-loop pixel correction process may have a high calculation complexity.

In the video codec, the complexity of the in-loop pixel correction process may be measured using video codec parameter information.

Additionally, using the measured complexity, jobs associated with the in-loop pixel correction process may be evenly distributed to encoding/decoding apparatuses for parallel correction of in-loop pixels, and accordingly, a parallel processing speed may be improved.

In the example embodiments, complexity may be measured using an appropriate parameter based on various in-loop pixel correction schemes, and an image may be optimally divided and may be processed in parallel, based on the measured complexity, so that jobs may be evenly distributed to a plurality of in-loop pixel correction apparatuses.

Additionally, when a plurality of in-loop pixel correction processes exist in the video codec, an apparatus and method according to example embodiments may be implemented using the following two schemes:

First, complexity may be measured for each of the plurality of in-loop pixel correction processes, and jobs may be optimally divided and may be processed in parallel.

Second, complexity for all of the in-loop pixel correction processes may be measured, and all jobs may be optimally divided and may be processed in parallel.

The above two methods may be used in a real-time processing device that may be operated at high speed during encoding and/or decoding. A video codec may be applied to a system, an apparatus, and a device that may require encoding and/or decoding, based on a multiprocessor or a multi-core processor, for example.

Hereinafter, a technical aspect of the example embodiments will be further described with reference to FIGS. 1 through 10.

FIG. 1 illustrates a block diagram of a parallel decoding apparatus for parallel correction of in-loop pixels based on complexity according to example embodiments. The parallel decoding apparatus may be included in a video codec, for example.

The parallel decoding apparatus of FIG. 1 may improve a parallel performance by evenly distributing jobs through calculation of complexity of an in-loop pixel correction process during decoding.

The parallel decoding apparatus of FIG. 1 may include a complexity measuring unit, and a core allocating unit 104. The complexity measuring unit may measure the complexity of the in-loop pixel correction process, using video codec parameter information in a video codec. The core allocating unit 104 may evenly distribute jobs associated with the in-loop pixel correction process, using the measured complexity.

In the video codec, the complexity of the in-loop pixel correction process may occupy a very high proportion of the total image complexity. Recently, an in-loop pixel correction technology is being frequently used in encoding and/or decoding, and is predicted to occupy a high proportion in complexity of the video codec.

To accurately calculate the complexity, the complexity measuring unit may include a parameter determining unit 101, a parameter loading unit 102, and a complexity calculating unit 103.

The parameter determining unit 101 may determine parameters required to measure complexity of a process of correcting in-loop pixels in a current image.

The parameter loading unit 102 may load an actually required parameter among the parameters determined by the parameter determining unit 101.

The complexity calculating unit 103 may calculate the complexity of the in-loop pixel correction process, based on the actually required parameter.

Additionally, the parallel decoding apparatus of FIG. 1 may further include one or more in-loop pixel correcting units 105, and an image restoring unit 106. The in-loop pixel correcting units 105 may perform post-processing, when the evenly distributed jobs are assigned to the in-loop pixel correcting units 105. The image restoring unit 106 may combine results of the post-processing, and may output a final restored image.

To calculate the complexity, the parameter determining unit 101 may determine parameters required to measure the complexity of the process of correcting in-loop pixels in the current image.

For example, when filtering for in-loop pixel correction is performed on a part of an image, rather than on the entire image, the parameter determining unit 101 may load on/off information regarding whether a filter is applied.

Additionally, because complexity may be determined based on a type of in-loop pixel correction, the parameter determining unit 101 may load information regarding the in-loop pixel correction process, to calculate the complexity.

When the parameters required to measure the complexity are determined, the parameter loading unit 102 may load information on the actually required parameter. Additionally, the complexity calculating unit 103 may calculate the complexity of the in-loop pixel correction process, using the information on the actually required parameter. The complexity may be measured in a predetermined unit.

The predetermined unit may include a single unit or several units among different types of units, for example a Coding Unit (CU), a Prediction Unit (PU), or a combination thereof.

The core allocating unit 104 may divide an image into regions based on a number of the in-loop pixel correcting units 105, and may respectively assign the regions to the in-loop pixel correcting units 105, based on the measured complexity so that the jobs may be evenly distributed to the in-loop pixel correcting units 105.

The in-loop pixel correcting units 105 may perform post-processing on the assigned regions. The image restoring unit 106 may combine results of the in-loop pixel correction process performed by the in-loop pixel correcting units 105, and may output the final restored image.

Figure 2:
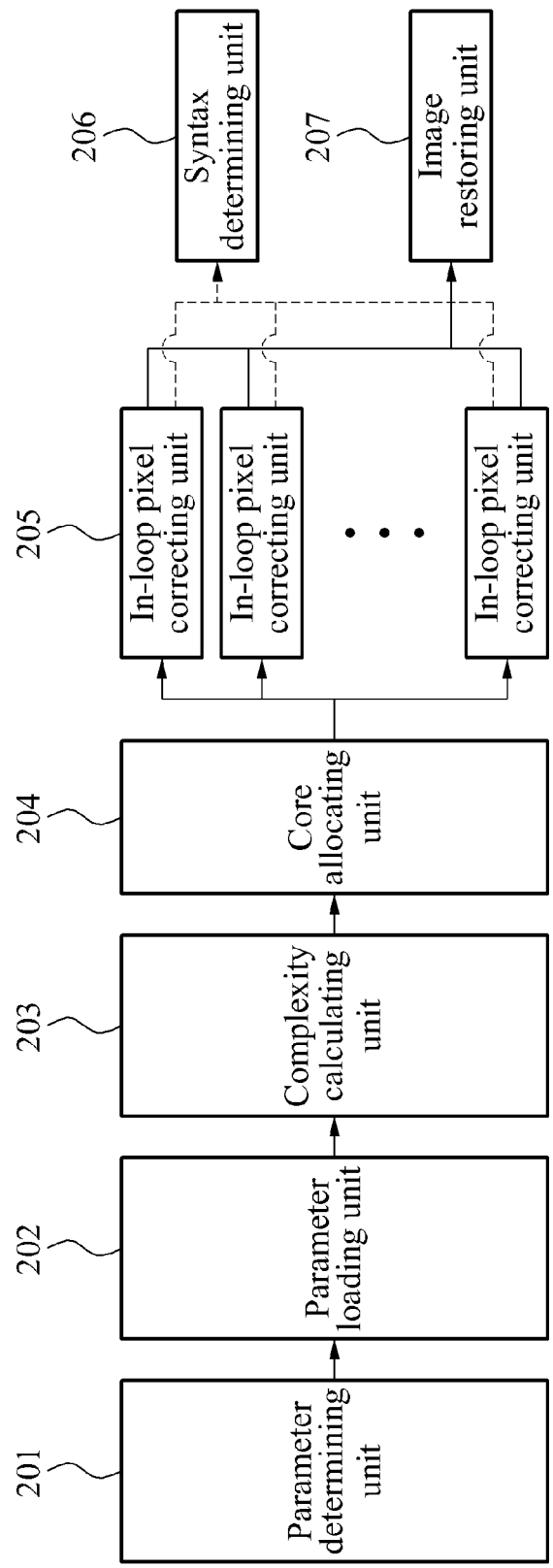
FIG. 2 illustrates a block diagram of a parallel encoding apparatus for parallel correction of in-loop pixels based on complexity according to example embodiments.

FIG. 2 illustrates a block diagram of a parallel encoding apparatus for parallel correction of in-loop pixels based on complexity according to example embodiments. The parallel encoding apparatus may be included in a video codec, for example.

The parallel encoding apparatus of FIG. 2 may parallel process jobs associated with an in-loop pixel correction process based on complexity of the in-loop pixel correction process.

The parallel encoding apparatus of FIG. 2 may perform a reverse operation of the parallel decoding apparatus of FIG. 1.

A parameter determining unit 201, a parameter loading unit 202, a complexity calculating unit 203, a core allocating unit 204, and one or more in-loop pixel correcting units 205 of FIG. 2 may be operated in the same manner as the parameter determining unit 101, the parameter loading unit 102, the complexity calculating unit 103, the core allocating unit 104, and the in-loop pixel correcting units 105, respectively, of FIG. 1.

The parameter determining unit 201 may determine parameters required to measure complexity of an in-loop pixel correction process during encoding.

The parameter loading unit 202 may load the parameters determined by the parameter determining unit 201, and may transmit the loaded parameters to the complexity calculating unit 203.

The complexity calculating unit 203 may calculate the complexity of the in-loop pixel correction process, in a predetermined unit. The predetermined unit may include, for example, a CU, a PU, or a combination thereof.

Subsequently, the core allocating unit 204 may divide an encoded image into regions and may provide the regions to the in-loop pixel correcting units 205 using the calculated complexity so that jobs associated with the in-loop pixel correction process may be evenly distributed to the in-loop pixel correcting units 205.

Each of the in-loop pixel correcting units 205 may perform encoding for in-loop pixel correction on the divided image. Additionally, a result of the encoding may be output, and accordingly a syntax determining unit 206 may output a determined syntax. However, in another in-loop pixel correction process, syntax may not be output, because the syntax determining unit 206 may not be operated. An image restoring unit 207 may combine the divided image output from the in-loop pixel correcting units 205, and may output a final restored image.

Figure 3:
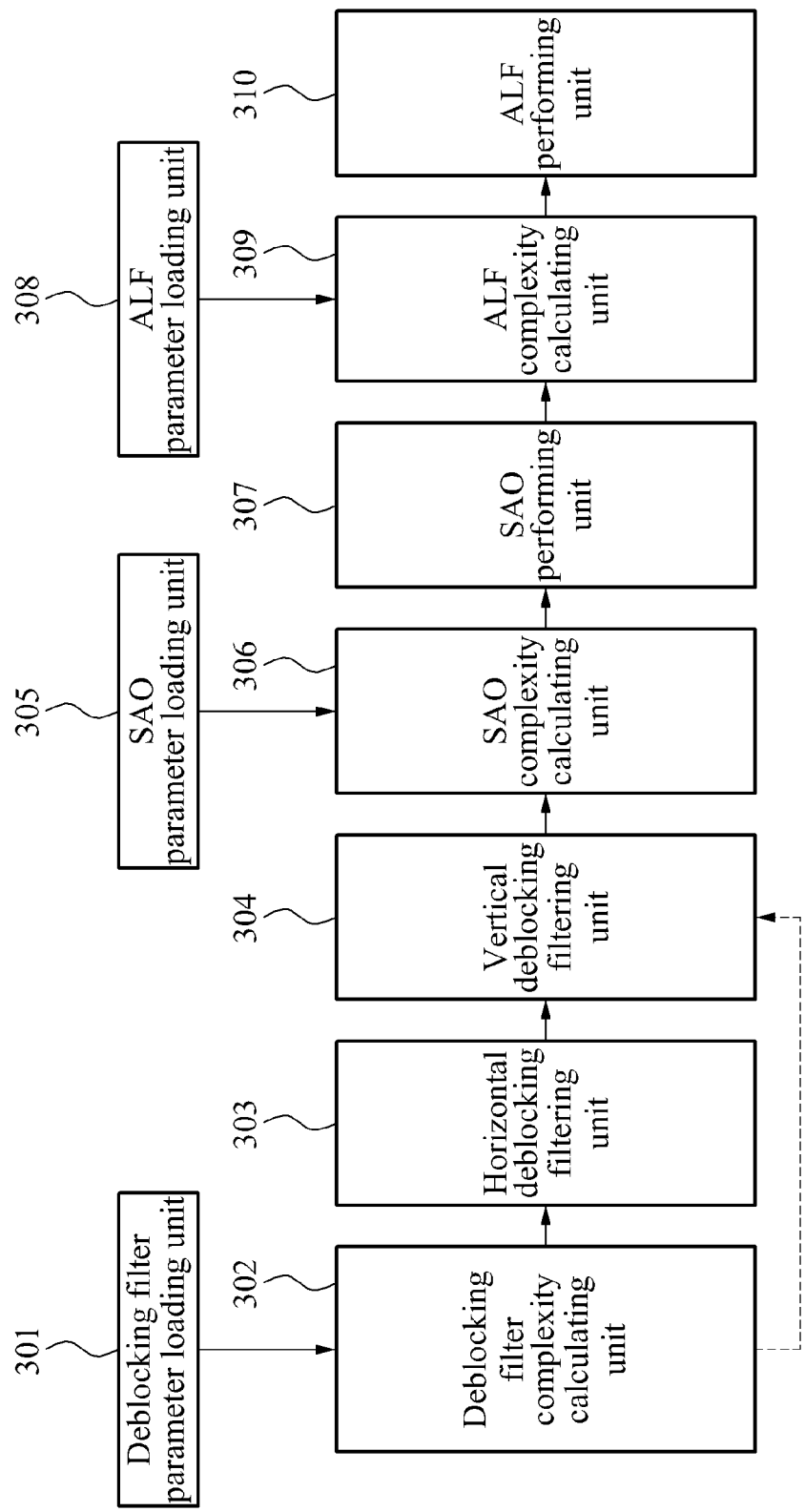
FIG. 3 illustrates a block diagram of an apparatus for parallel correction of in-loop pixels based on complexity, in an order of a de-blocking filter, a Sample Adaptive Offset (SAO), and an Adaptive Loop Filter (ALF) according to example embodiments.

FIG. 3 illustrates a block diagram of an apparatus for parallel correction of in-loop pixels based on complexity, in an order of a de-blocking filter, a Sample Adaptive Offset (SAO), and an Adaptive Loop Filter (ALF) according to example embodiments.

Specifically, FIG. 3 illustrates an encoding/decoding apparatus that may measure complexity for each of a plurality of in-loop pixel correction processes, and may perform the in-loop pixel correction processes in parallel.

The in-loop pixel correction processes may be sequentially performed through three filtering operations, namely, the de-blocking filter, the SAO, and the ALF.

First, a de-blocking filter parameter loading unit 301, a de-blocking filter complexity calculating unit 302, a horizontal de-blocking filtering unit 303, and a vertical de-blocking filtering unit 304 may measure de-blocking filter complexity for an input image, using a de-blocking filter parameter, and may evenly divide jobs associated with de-blocking filtering, based on the measured de-blocking filter complexity, to increase an efficiency of parallel de-blocking filtering.

Subsequently, an SAO parameter loading unit 305, an SAO complexity calculating unit 306, and an SAO performing unit 307 may measure SAO complexity using an SAO parameter in an SAO operation, and may evenly divide jobs associated with an SAO, based on the measured SAO complexity, to increase an efficiency of parallel processing of the SAO.

Additionally, an ALF parameter loading unit 308, an ALF complexity calculating unit 309, and an ALF performing unit 310 may measure ALF complexity using an ALF parameter in an ALF operation, and may evenly distribute jobs associated with an ALF, based on the measured ALF complexity, to increase an efficiency of parallel processing of the ALF.

More specifically, in FIG. 3, to perform parallel de-blocking filtering based on complexity, the following operations may be performed. First, the de-blocking filter parameter loading unit 301 may determine a parameter used to measure complexity of the de-blocking filter, and may load the determined parameter.

Subsequently, the de-blocking filter complexity calculating unit 302 may calculate a complexity of the loaded parameter. In this instance, the de-blocking filter may perform filtering in two stages, such as horizontal filtering and vertical filtering, for example, and accordingly complexity of the horizontal filtering and complexity of the vertical filtering may be analyzed. An image may be allocated so that jobs may be evenly assigned to a plurality of de-blocking filtering units, using the analyzed complexity of the horizontal filtering and the analyzed complexity of the vertical filtering. The horizontal de-blocking filtering unit 303 and the vertical de-blocking filtering unit 304 may perform horizontal de-blocking filtering and vertical de-blocking filtering, respectively.

In FIG. 3, to perform parallel SAO based on complexity, the following operations may be processed.

The SAO parameter loading unit 305 may determine an SAO parameter required to measure complexity of an SAO, and may load the determined SAO parameter.

The SAO complexity calculating unit 306 may calculate complexity based on a basic unit of SAO filtering, using the SAO parameter as an input. To perform the SAO based on a basic unit of complexity measurement, the entire image may be divided and assigned so that jobs may be evenly distributed to SAO performing units, for example the SAO performing unit 307. Subsequently, the SAO performing unit 307 may perform the SAO.

The SAO performing unit 307 may determine whether the SAO is performed, and determine how to perform the SAO, based on the calculated complexity.

Additionally, a pixel group may be defined based on a type of the SAO. A value output from an encoder may be collectively added to each pixel group, and encoding error may be minimized. As an in-loop filtering operation after the SAO, ALF may be performed.

In FIG. 3, to perform parallel ALF based on complexity, the following operations may be performed.

First, the ALF may correct a restored image to be most similar to an original image. The ALF parameter loading unit 308 may determine an ALF parameter used to calculate complexity of the ALF, and may load the determined ALF parameter. The ALF complexity calculating unit 309 may calculate complexity in a predetermined unit, using the loaded ALF parameter as an input, and may divide an image based on the calculated complexity.

Subsequently, the ALF complexity calculating unit 309 may assign the divided image so that jobs may be evenly distributed to ALF performing units, for example the ALF performing unit 310, and may perform ALF filtering on a part of the image.

Figure 4:
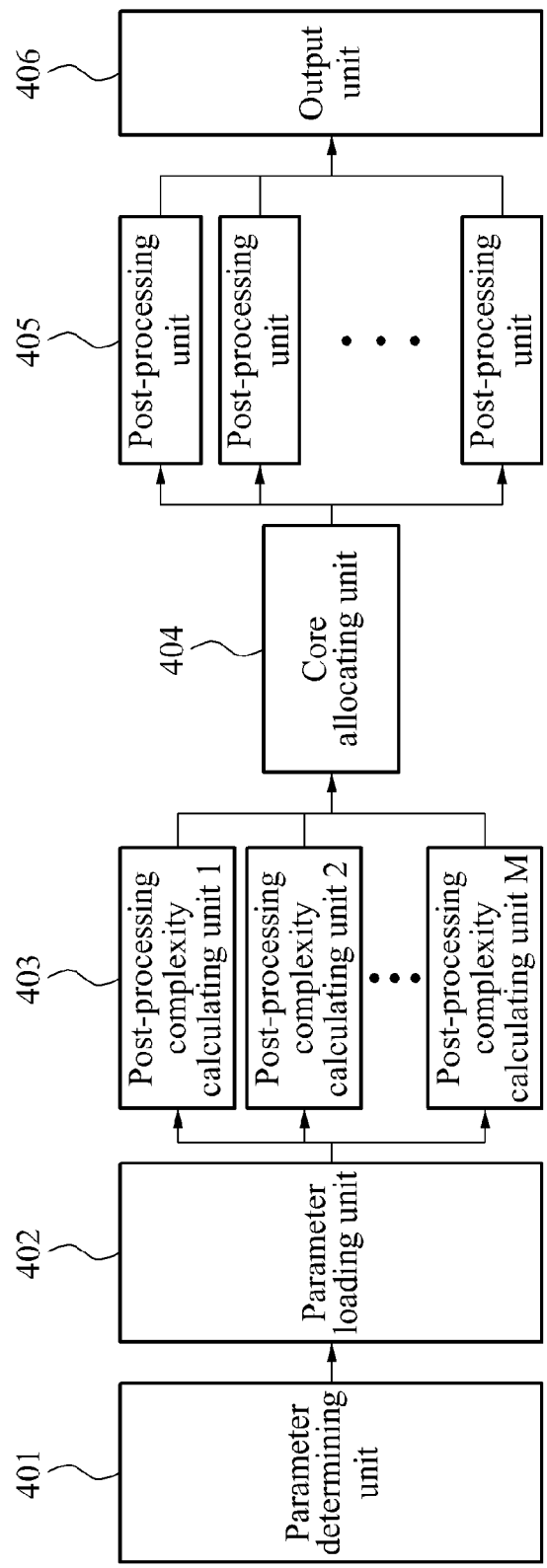
FIG. 4 illustrates a block diagram of an encoding apparatus for measuring complexity for each of a plurality of in-loop pixel correction processes, combining the measured complexity, and parallel correction of in-loop pixels based on the complexity according to example embodiments.

FIG. 4 illustrates a block diagram of an encoding apparatus for measuring complexity for each of a plurality of in-loop pixel correction processes, combining the measured complexity, and parallel correction of in-loop pixels based on the complexity according to example embodiments.

The encoding apparatus of FIG. 4 may be used when a plurality of in-loop pixel correcting units exist.

The encoding apparatus of FIG. 4 may predict complexity of correction of in-loop pixels in a current image, in a predetermined region unit, and may divide the current image so that complexity may be evenly distributed to each of the in-loop pixel correcting units. The in-loop pixel correcting units may correct the in-loop pixels in parallel, using the divided image as an input. Thus, parallel processing may be effectively performed.

Accordingly, the in-loop pixel correcting units may evenly process jobs and thus, an efficiency of maximum parallel processing may be increased. The encoding apparatus of FIG. 4 may determine a parameter used to measure complexity based on a characteristic of the in-loop pixel correction process, may measure complexity using the parameter as an input, and may divide an image into regions based on a number of video codecs, to achieve equal complexity. Additionally, the regions may be assigned to the in-loop pixel correcting units, and the in-loop pixels may be corrected. For example, when the in-loop pixel correction is performed, an encoder may output an encoded syntax and an image having corrected pixels, and a decoder may output an image having corrected in-loop pixels.

In an example, when a plurality of in-loop pixel correction processes are performed, complexity of all of the in-loop pixel correction processes may be measured, and regions into which an image is divided may be assigned to a video codec in all of the in-loop pixel correction processes. In another example, when a plurality of in-loop pixel correction processes are performed, complexity may be measured for each of the in-loop pixel correction processes, using a parameter, an image may be optimally divided based on the measured complexity, and the in-loop pixel correction processes may be sequentially performed.

Referring to FIG. 4, a parameter determining unit 401 may determine parameters used to measure complexity of all of the in-loop pixel correction processes.

The parameter loading unit 402 may collect information on the parameters determined by the parameter determining unit 401.

One or more post-processing complexity calculating units 403, for example a post-processing complexity calculating unit 1, a post-processing complexity calculating unit 2, a post-processing complexity calculating unit M, and the like, may calculate the complexity of all of the in-loop pixel correction processes, using a scheme suitable for each of the in-loop pixel correction processes.

The post-processing complexity calculating units 403 may perform filtering, for example a de-blocking filter, an SAO, and an ALF. A core allocating unit 404 employing a plurality of parameters may assign regions, into which an image is divided, to one or more post-processing units 405 so that all of the in-loop pixel correction processes may be efficiently performed in parallel, based on the complexity output from the post-processing complexity calculating units 403.

An output unit 406 may combine results of the post-processing received from the post-processing units 405 into a single result, and may output the combined result.

In the case of an encoder, an image of which syntax and in-loop pixels are corrected may be output. In the case of a decoder, an image of which in-loop pixels are corrected may be obtained.

Figure 5:
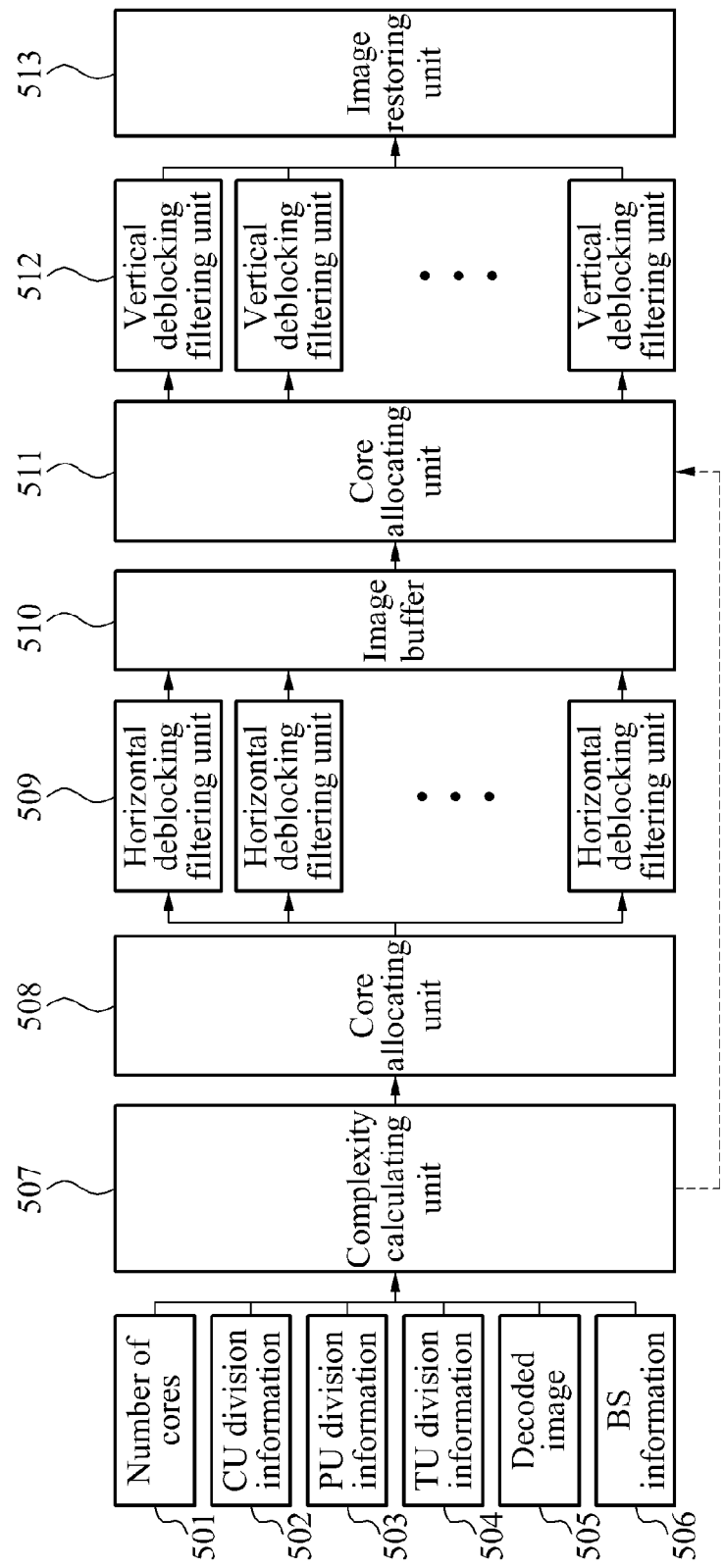
FIG. 5 illustrates a block diagram of an apparatus for parallel encoding and decoding based on complexity during de-blocking filtering according to example embodiments.

FIG. 5 illustrates a block diagram of an apparatus for parallel encoding and decoding based on complexity during de-blocking filtering according to example embodiments.

When the de-blocking filtering is performed in parallel using a plurality of cores, the apparatus of FIG. 5 may measure complexity of horizontal filtering, may respectively assign regions of an image to horizontal de-blocking filtering units, and may perform the horizontal filtering. Subsequently, the apparatus of FIG. 5 may respectively assign the regions to the cores in association with vertical filtering, and may perform the vertical filtering.

Parameters used to calculate complexity during the de-blocking filtering may be determined by the parameter determining unit 301 of FIG. 3, and may include, for example, a number of cores 501, CU division information 502, PU division information 503, Transform Unit (TU) division information 504, a decoded image 505, and Boundary Strength (BS) information 506. This is because whether the de-blocking filtering is performed may be determined based on division information and a value of a neighboring pixel.

The number of cores 501 may be interpreted to be information on a number of de-blocking filtering units.

To evenly assign jobs to the de-blocking filtering units, the number of cores 501 may be required to measure the complexity.

The CU division information 502 may be information regarding a basic CU of encoding/decoding, and may be associated with a division form of a CU with respect to the entire image. The PU division information 503 may be information regarding a PU of the encoding/decoding of the video, and the TU division information 504 may be information regarding a shape of a transform block when transforming is performed during the encoding/decoding. The decoded image 505 may refer to an image decoded through operations prior to the de-blocking filtering such as entropy decoding, inverse-quantization, or inverse-transform, for example. The BS information 506 may refer to a value of a boundary strength calculated in a block boundary.

A complexity calculating unit 507 may receive, as inputs, information regarding the parameters, for example the number of cores 501, the CU division information 502, the PU division information 503, the TU division information 504, the decoded image 505, and the BS information 506, and may calculate the complexity of the de-blocking filter using the received information.

The complexity calculating unit 507 may calculate the complexity, based on a characteristic of the de-blocking filter.

For example, when de-blocking filtering is not performed in an operation lower than 8×8, a position to which filtering is applied may be verified, and the complexity may be measured.

The de-blocking filtering may be divided into horizontal filtering and vertical filtering in association with the entire image. Accordingly, complexity may be measured for each of the horizontal filtering and vertical filtering. Based on horizontal complexity calculated by the complexity calculating unit 507, a core allocating unit 508 may divide an image and assign the divided image so that jobs may be evenly distributed to horizontal de-blocking filtering units 509.

The horizontal de-blocking filtering units 509 may perform de-blocking filtering horizontally in a boundary of filtering of the assigned image. Each of the horizontal de-blocking filtering units 509 may receive the divided image, and may perform horizontal de-blocking filtering. An image buffer 510 may combine images on which horizontal de-blocking filtering is performed by the horizontal de-blocking filtering units 509, into a single image, and may store the combined image.

Subsequently, a core allocating unit 511 may divide the combined image into regions so that jobs may be evenly divided, and may assign the regions to vertical de-blocking filtering units 512, to perform vertical de-blocking filtering. In this instance, information on vertical complexity calculated by the complexity calculating unit 507 may be received as an input. An image restoring unit 513 may combine regions of the image, on which de-blocking filtering is performed both horizontally and vertically, into a single image.

Figure 6:
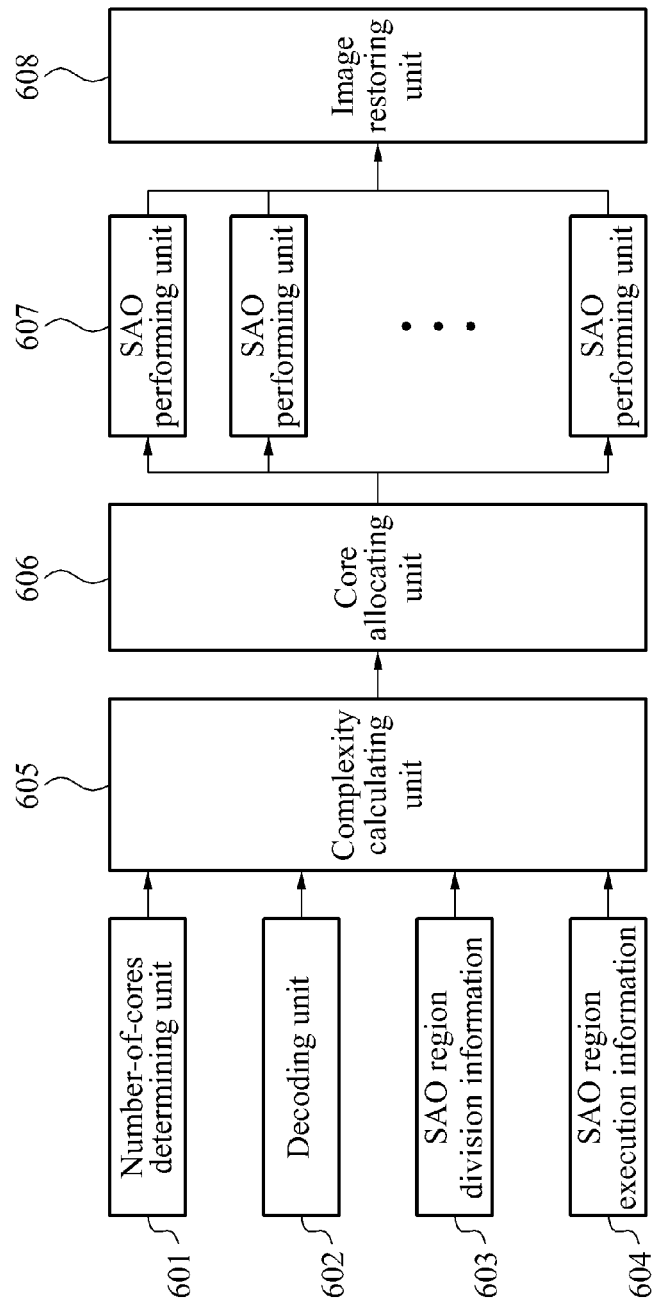
FIG. 6 illustrates a block diagram of an apparatus for performing parallel decoding based on complexity during SAO filtering according to example embodiments.

FIG. 6 illustrates a block diagram of an apparatus for performing parallel decoding based on complexity during SAO filtering according to example embodiments.

Specifically, FIG. 6 illustrates a decoding apparatus for an SAO in-loop pixel correction process to perform the parallel decoding.

The decoding apparatus of FIG. 6 may perform an SAO operation subsequent to the de-blocking filtering.

An SAO may refer to an in-loop pixel correction scheme to minimize an error in an original image by collectively adding predetermined sizes to a pixel group.

Referring to FIG. 6, a number-of-cores determining unit 601, a decoding unit 602, SAO region division information 603, and SAO region execution information 604 may be information on parameters used to analyze complexity of the SAO. When the SAO is performed in parallel, and when a plurality of SAO performing units exist, information on a number of the SAO performing units may be collected by the number-of-cores determining unit 601 to evenly assign jobs.

The decoding unit 602 may refer to an image decoded prior to the in-loop pixel correction process. For example, when a plurality of in-loop pixel correction processes exist, the decoding unit 602 may be an image decoded in a previous in-loop pixel correction process.

The SAO region division information 603 may be information on a region used as a basic unit during processing of the SAO.

The SAO region execution information 604 may be information regarding various operations, such as an operation of determining a group of pixels or an operation of having an offset, for example.

A complexity calculating unit 605 may calculate the complexity of the SAO, using the above information as an input.

To calculate the complexity, the complexity calculating unit 605 may verify the SAO region execution information 604 associated with regions, into which a current image is divided, and may determine the complexity based on whether the SAO is performed, or may determine the complexity based on a type of the SAO region execution information 604. The complexity calculating unit 605 may calculate the complexity, using a predetermined region or a block unit and the like as a basic unit, and may transfer the calculated complexity to a core allocating unit 606.

The core allocating unit 606 may divide the image into regions, to evenly distribute jobs associated with the SAO in the image, and may transfer the regions to SAO performing units 607.

The SAO performing units 607 may perform the SAO in parallel on the received regions of the image. Subsequently, the regions on which the SAO is performed may be output, and an image restoring unit 608 may combine the output regions into a single image.

Figure 7:
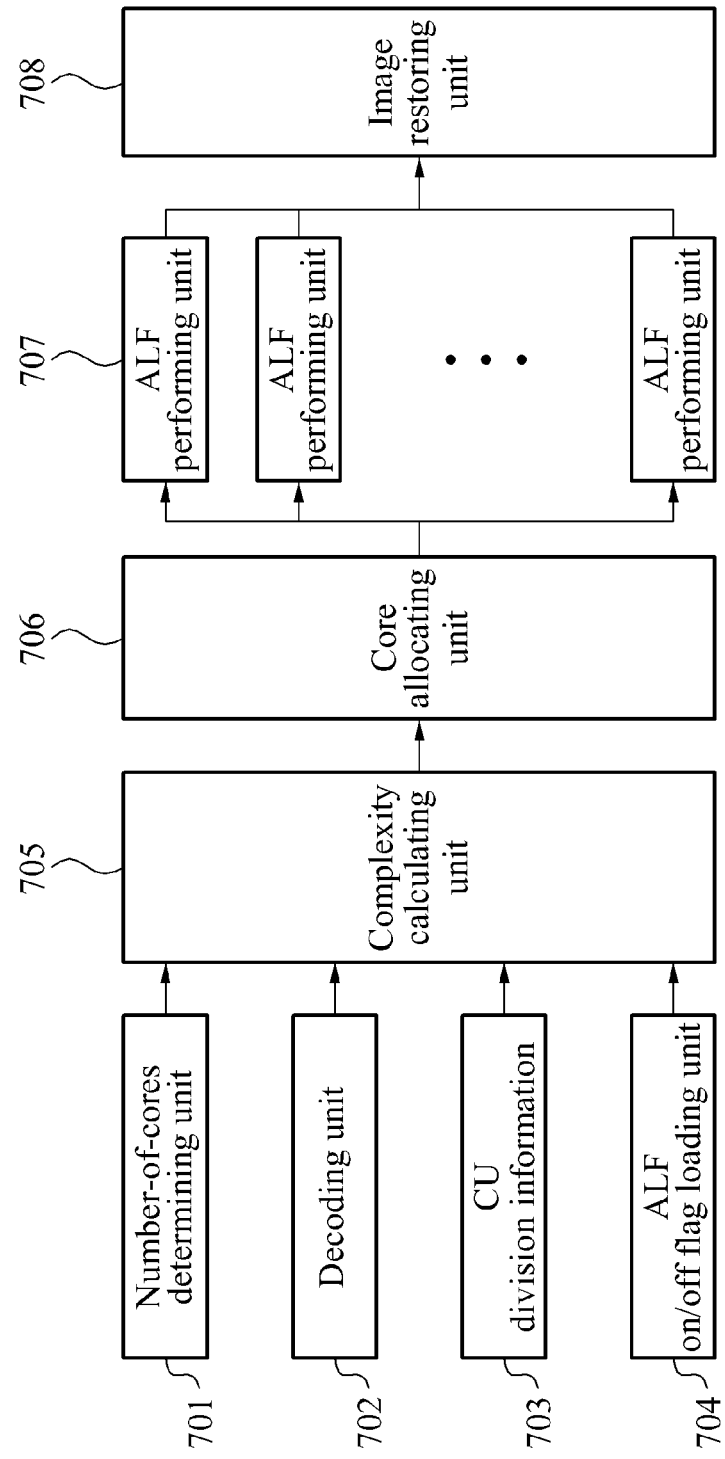
FIG. 7 illustrates a block diagram of an apparatus for performing parallel decoding based on complexity during an ALF according to example embodiments.

FIG. 7 illustrates a block diagram of an apparatus for performing parallel decoding based on complexity during an ALF according to example embodiments.

Specifically, FIG. 7 illustrates a decoding apparatus for performing filtering using an ALF, to parallel correct in-loop pixels.

FIG. 7 illustrates, in detail, the ALF parameter loading unit 308, the ALF complexity calculating unit 309, and the ALF performing unit 310 of FIG. 3. A number-of-cores determining unit 701 may determine a number of ALF performing units 707 that may be used to perform the ALF in parallel.

A decoding unit 702 may decode an image, prior to the ALF. CU division information 703 may indicate a CU used as a basic unit during the ALF.

An ALF on/off flag loading unit 704 may collect a syntax indicating whether the ALF is to be performed in a current CU among CUs.

For example, when information regarding whether the ALF is to be applied for each CU is transmitted in a slice header unit, the information may be collected through bitstream parsing. Because complexity may vary depending on existence or nonexistence of a plurality of blocks for filtering in a predetermined region of an image, the information may correspond to a parameter used to evenly distribute the complexity.

A complexity calculating unit 705 may calculate complexity of a predetermined region of an image, using a parameter used to calculate complexity of a previous operation.

A core allocating unit 706 may divide the image into regions and may transfer the regions to the ALF performing units 707 so that jobs may be evenly distributed to the ALF performing units 707, based on the calculated complexity.

When regions of the image, on which the ALF is performed by the ALF performing units 707, are output, an image restoring unit 708 may combine the regions into a single image.

Figure 8:
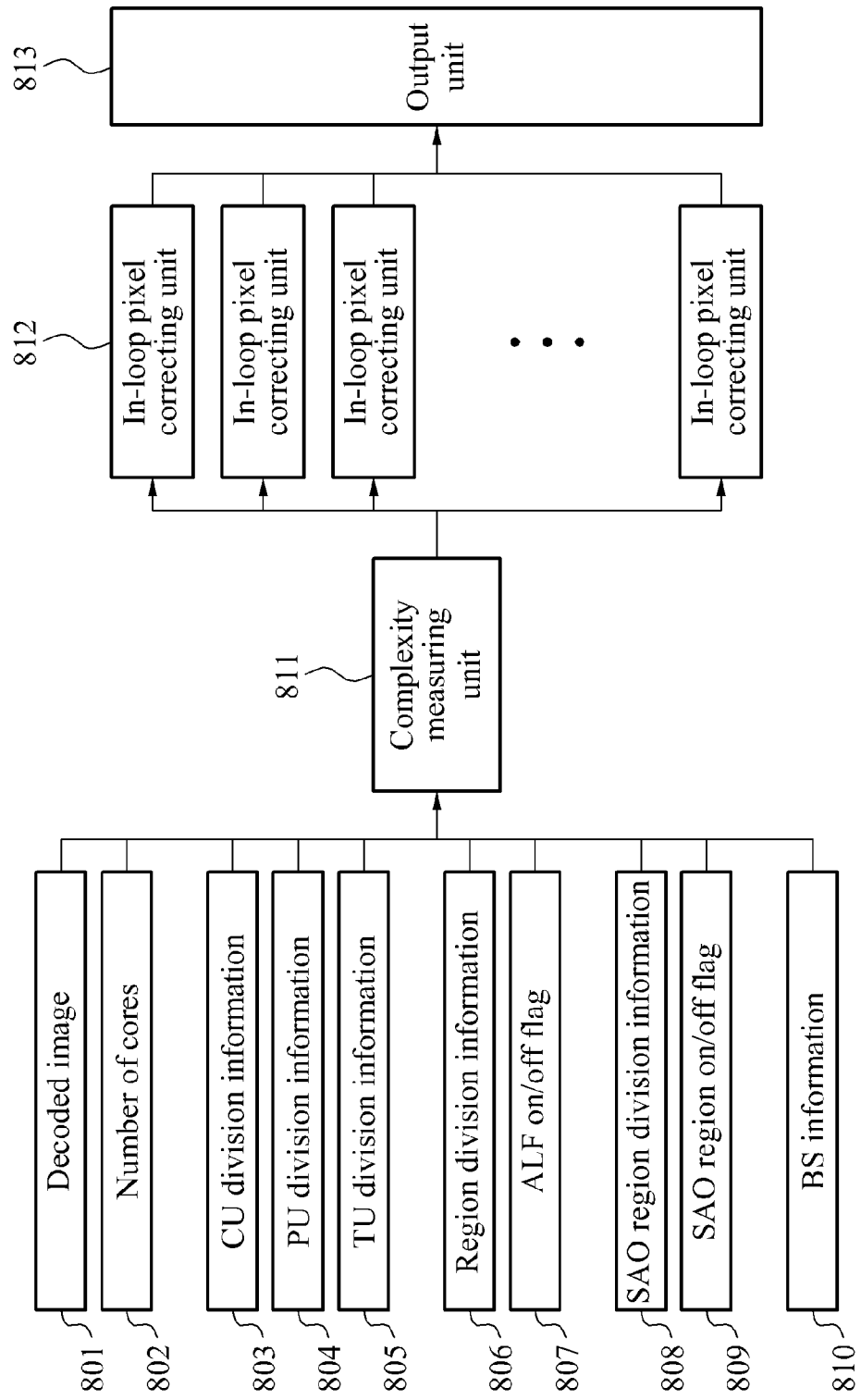
FIG. 8 illustrates a block diagram of an apparatus for measuring complexity for all of a plurality of in-loop pixel correction processes and performing parallel decoding according to example embodiments.

FIG. 8 illustrates a block diagram of an apparatus for measuring complexity for all of a plurality of in-loop pixel correction processes and for performing parallel decoding according to example embodiments.

Specifically, FIG. 8 illustrates an encoding/decoding apparatus for performing all of the in-loop pixel correction processes in parallel.

The encoding/decoding apparatus of FIG. 3 may sequentially measure complexity for each of a plurality of in-loop pixel correction processes, and may perform the in-loop pixel correction processes in parallel, whereas the encoding/decoding apparatus of FIG. 8 may measure complexity for all of the in-loop pixel correction processes, may divide an image using the measured complexity as an input, and may perform the in-loop pixel correction processes in parallel.

A decoded image 801, a number of cores 802, CU division information 803, PU division information 804, TU division information 805, region division information 806, an ALF on/off flag 807, SAO region division information 808, an SAO region on/off flag 809, and BS information 810 may be information on all parameters required for the in-loop pixel correction processes.

A complexity measuring unit 811 may measure complexity, based on the in-loop pixel correction processes, and complexity measurement parameters, may divide an image into regions based on the measured complexity, and may transmit the regions to in-loop pixel correcting units 812.

The in-loop pixel correcting unit 812 may sequentially perform the in-loop pixel correction processes, and may output, to an output unit 813, the regions of the image on which all of the in-loop pixel correction processes are terminated.

The output unit 813 may output a result of the in-loop pixel correction processes. In the case of an encoder, an image of which syntax of in-loop pixel correction and in-loop pixels are corrected may be output. In the case of a decoder, an image of which in-loop pixels are corrected may be obtained.

Figure 9:
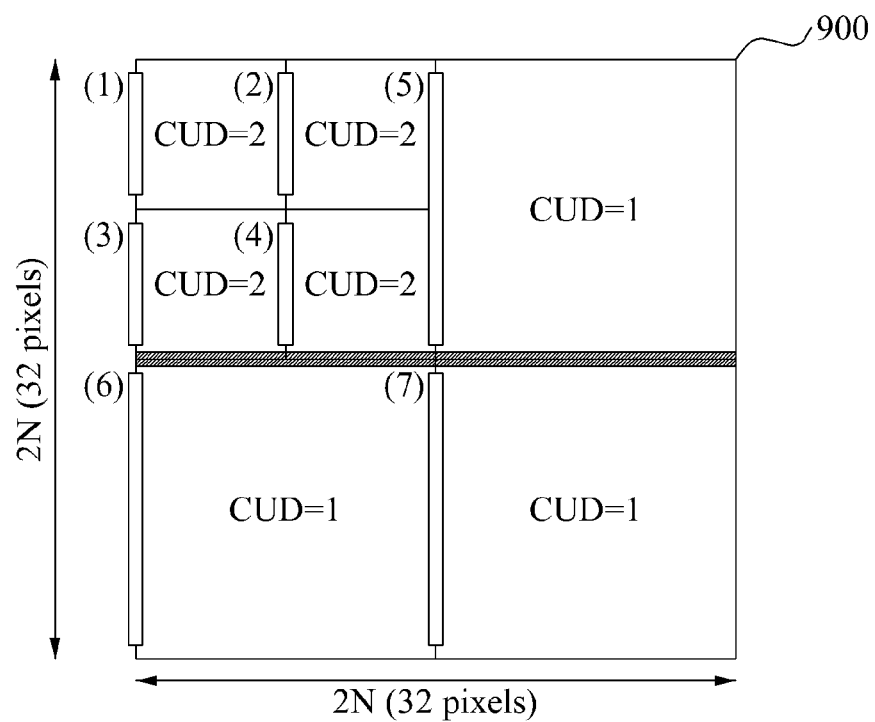
FIG. 9 illustrates a diagram of a conventional scheme of parallel performing de-blocking filtering.

FIG. 9 illustrates a diagram of a conventional scheme of parallel performing de-blocking filtering.

In FIG. 9, a single block may be used as a CU, and a number of times a Largest Coding Unit (LCU) 900 is divided into CUs in a quad tree may be represented using a Coding Unit Depth (CUD). Additionally, numbers in parentheses in FIG. 9 may refer to numbers assigned to positions of regions to be filtered, and a filtering position may be determined based on CU divided information. In the conventional scheme of FIG. 9, an image may be evenly divided using a number of cores, regardless of a complexity of filtering.

Referring to FIG. 9, a first de-blocking filtering unit and a second de-blocking filtering unit may perform the de-blocking filtering in parallel. The first de-blocking filtering unit may perform filtering (1) to (5), and the second de-blocking filtering unit may perform filtering (6) and (7). Because a relatively large number of regions on which filtering is to be performed may be assigned to the first de-blocking filtering unit, parallel processing may not be performed effectively.

Figure 10:
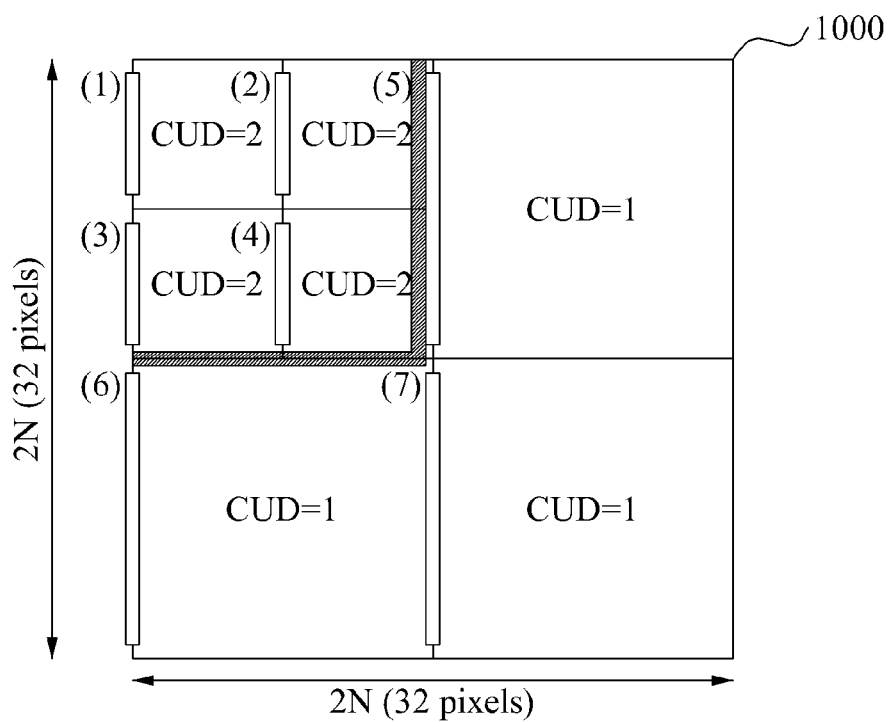
FIG. 10 illustrates a diagram of a scheme of parallel performing de-blocking filtering according to example embodiments.

FIG. 10 illustrates a diagram of a scheme of parallel performing de-blocking filtering according to example embodiments.

In the scheme of FIG. 10, de-blocking filtering may be performed in parallel. Specifically, an image may be divided so that jobs may be evenly distributed to de-blocking filtering units, using information on a de-blocking filter parameter, based on complexity.

The information on the de-blocking filter parameter may include, for example, a CUD. Additionally, complexity may be measured in an LCU 1000 as a basic unit, and may be divided.

Referring to FIG. 10, a first de-blocking filtering unit may perform filtering on regions (1) to (4) in an image based on a single LCU, and a second de-blocking filtering unit may perform filtering on the other regions. The regions of the image may have different sizes. However, because a number of regions to be filtered is increased, as a CUD is increased in view of complexity, an image may be divided into regions so that equal complexity may be obtained, and the regions may be assigned to de-blocking filtering units. Accordingly, parallel processing may be effectively performed.

FIG. 11 illustrates a diagram of a scheme of parallel performing de-blocking filtering when an LCU line is used as a basic unit, according to example embodiments.

The LCU line used as a basic unit may indicate a plurality of LCUs 1100 included in an image. An image may be divided in the same manner as the scheme of FIG. 10. Based on information on CUDs, an LCU line 1 having higher complexity may be assigned to a first de-blocking filtering unit, and LCU lines 2 and 3 having lower complexity may be assigned to a second de-blocking filtering unit.

In this instance, jobs may be evenly distributed to the first de-blocking filtering unit and the second de-blocking filtering unit and accordingly, parallel processing of the de-blocking filtering may be effectively performed.

The methods for parallel correction of in-loop pixels based on complexity according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An encoding/decoding apparatus for parallel correction of in-loop pixels, the encoding/decoding apparatus comprising:
   a complexity measuring unit to measure a complexity of different in-loop pixel correction processes in a video codec, using video codec parameter information; and
   a core allocating unit to evenly distribute jobs associated with the in-loop pixel correction process, using the measured complexity,
   wherein the complexity measuring unit comprises:
      a parameter determining unit to determine parameters required to measure a complexity of a process of correcting an in-loop pixel in a current image;
      a parameter loading unit to load an actually required parameter among the parameters; and
      a plurality of post-processing complexity calculating units to calculate a complexity for different in-loop pixel correction processes corresponding to the actually required parameter.

2. The encoding/decoding apparatus of claim 1, further comprising:
   one or more in-loop pixel correcting units to perform post-processing, when the evenly distributed jobs are assigned to the in-loop pixel correcting units; and
   an image restoring unit to combine results of the post-processing, and to output a final restored image.

3. The encoding/decoding apparatus of claim 2, further comprising:
   a syntax determining unit to output a determined syntax using the results of the post-processing.

4. The encoding/decoding apparatus of claim 1, wherein the parameter loading unit comprises a de-blocking filter parameter loading unit to determine a de-blocking filter parameter, and to load the determined de-blocking filter parameter, the de-blocking filter parameter being used to measure a complexity of a de-blocking filter, and
   wherein the complexity calculating unit comprises a de-blocking filter complexity calculating unit to calculate a complexity of the loaded de-blocking filter parameter.

5. The encoding/decoding apparatus of claim 4, further comprising:

a horizontal de-blocking filtering unit to perform horizontal de-blocking filtering, based on the calculated complexity of the de-blocking filter parameter; and a vertical de-blocking filtering unit to perform vertical de-blocking filtering, based on the calculated complexity of the de-blocking filter parameter.

6. The encoding/decoding apparatus of claim 1, wherein the parameter loading unit comprises a Sample Adaptive Offset (SAO) parameter loading unit to determine an SAO parameter, and to load the determined SAO parameter, the SAO parameter being used to measure a complexity of an SAO, and wherein the complexity calculating unit comprises an SAO complexity calculating unit to calculate a complexity based on a basic unit of SAO filtering, using the loaded SAO parameter.

7. An encoding/decoding apparatus for parallel correction of in-loop pixels, the encoding/decoding apparatus comprising:

a complexity measuring unit to measure a complexity of an in-loop pixel correction process in a video codec, using video codec parameter information; and a core allocating unit to evenly distribute lobs associated with the in-loop pixel correction process, using the measured complexity, wherein the complexity measuring unit comprises:
a parameter determining unit to determine parameters required to measure a complexity of a process of correcting an in-loop pixel in a current imaqe;

a parameter loading unit to load an actually required parameter among the parameters; and a complexity calculating unit to calculate the complexity of the in-loop pixel correction process, based on the actually required parameter; and an SAO performing unit to determine whether a Sample Adaptive Offset (SAO) is performed and how to perform the SAO, based on the calculated complexity, wherein the parameter loading unit comprises a SAO parameter loading unit to determine an SAO parameter, and to load the determined SAO parameter, the SAO parameter being used to measure a complexity of an SAO, and wherein the complexity calculating unit comprises an SAO complexity calculating unit to calculate a complexity based on a basic unit of SAO filtering, using the loaded SAO parameter.

8. The encoding/decoding apparatus of claim 1, wherein the parameter loading unit comprises an Adaptive Loop Filter (ALF) parameter loading unit to determine an ALF parameter, and to load the determined ALF parameter, the ALF parameter being used to measure a complexity of an ALF, and wherein the complexity calculating unit comprises an ALF complexity calculating unit to calculate a complexity in a predetermined unit, using the loaded ALF parameter.

9. The encoding/decoding apparatus of claim 8, further comprising:

an ALF performing unit to perform the ALF, based on the calculated complexity.

10. An encoding/decoding method for parallel correction of in-loop pixels, the encoding/decoding method comprising:

measuring, by a video codec, a complexity of different in-loop pixel correction processes, using video codec parameter information during encoding/decoding; and evenly distributing jobs associated with the in-loop pixel correction process, using the measured complexity, wherein measuring a complexity of an in-loop pixel correction process comprises:

determining parameters required to measure a complexity of a process of correcting an in-loop pixel in a current image;

loading an actually required parameter among the parameters; and calculating a complexity for different in-loop pixel correction processes corresponding to the actually required parameter.

11. The encoding/decoding method of claim 10, further comprising:

performing post-processing, when the evenly distributed jobs are assigned; and combining results of the post-processing and outputting a final restored image.

12. A non-transitory computer readable recording medium storing a program to cause a computer to implement the method of claim 10.

13. The encoding/decoding method of claim 11, further comprising:

outputting a determined syntax using the results of the post-processing.

14. The encoding/decoding method of claim 10, wherein loading an actually required parameter comprises determining a de-blocking filter parameter and loading the determined de-blocking filter parameter used to measure a complexity of a de-blocking filter, and wherein calculating the complexity of an in-loop pixel correction process comprises calculating a complexity of the loaded de-blocking filter parameter.

15. The encoding/decoding method of claim 14, further comprising:

performing horizontal de-blocking filtering, based on the calculated complexity of the de-blocking filter parameter; and performing vertical de-blocking filtering, based on the calculated complexity of the de-blocking filter parameter.

16. The encoding/decoding method of claim 10, wherein loading an actually required parameter comprises determining a Sample Adaptive Offset (SAO) parameter, and loading the determined SAO parameter used to measure a complexity of an SAO, and wherein calculating the complexity of an in-loop pixel correction process comprises calculating a complexity based on a basic unit of SAO filtering, using the loaded SAO parameter.

17. An encoding/decoding method for parallel correction of in-loop pixels, the encoding/decoding method comprising:

measuring, by a video codec, a complexity of an in-loop pixel correction process, using video codec parameter information during encoding/decoding; and evenly distributing lobs associated with the in-loop pixel correction process, using the measured complexity, wherein the measuring comprises:

determining parameters required to measure a complexity of a process of correcting an in-loop pixel in a current image;

loading an actually required parameter among the parameters; and calculating the complexity of the in-loop pixel correction process, based on the actually required parameter, determining whether a Sample Adaptive Offset (SAO) is performed and how to perform the SAO, based on the calculated complexity, wherein loading an actually required parameter comprises determining a SAO parameter, and loading the determined SAO parameter used to measure a complexity of an SAO, and wherein calculating the complexity of the in-loop pixel correction process comprises calculating a complexity based on a basic unit of SAO filtering, using the loaded SAO parameter.

18. The encoding/decoding method of claim 10, wherein loading an actually required parameter comprises determining an Adaptive Loop Filter (ALF) parameter, and loading the determined ALF parameter used to measure a complexity of an ALF, and wherein calculating the complexity of an in-loop pixel correction process comprises calculating a complexity in a predetermined unit, using the loaded ALF parameter.

19. The encoding/decoding method of claim 18, further comprising:

performing the ALF based on the calculated complexity.

20. The encoding/decoding method of claim 14, wherein de-blocking filtering parameters include at least one of a number of cores, coding unit division information, prediction unit division information, transform unit division information, a decoded image, and boundary strength information.

* * * * *

UNITED STATES PATENT AND TRADEMARK OFFICE
CERTIFICATE OF CORRECTION

PATENT NO. : 9,237,351 B2  Page 1 of 1
APPLICATION NO. : 13/606544
DATED : January 12, 2016
INVENTOR(S) : Doo Hyun Kim et al.

It is certified that error appears in the above-identified patent and that said Letters Patent is hereby corrected as shown below:

Title Page

Item (73) Assignees:
Delete "COLLABORATIVE" and insert -- COLLABORATION --, therefor.

Claims

Column 13, Line 23, Claim 7
Delete "lobs" and insert -- jobs --, therefor.

Column 13, Line 29, Claim 7
Delete "imaqe;" and insert -- image; --, therefor.

Column 14, Line 53, Claim 17
Delete "lobs" and insert -- jobs --, therefor.

Signed and Sealed this
Twenty-fourth Day of May, 2016

Michelle K. Lee
*Director of the United States Patent and Trademark Office*